March 29, 1966        E. KOMENDA        3,243,221
SEATING ARRANGEMENT FOR AUTOMOTIVE VEHICLE BODY
Filed April 7, 1964        2 Sheets-Sheet 2
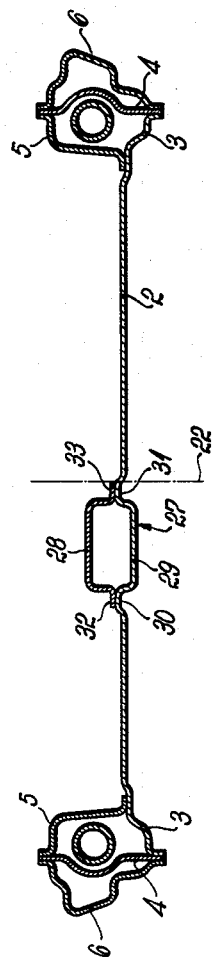
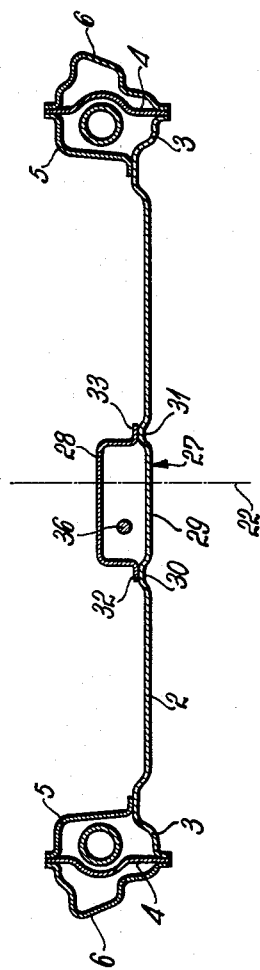
INVENTOR
Erwin KOMENDA
By Dicke + Craig
ATTORNEYS

United States Patent Office 3,243,221
Patented Mar. 29, 1966

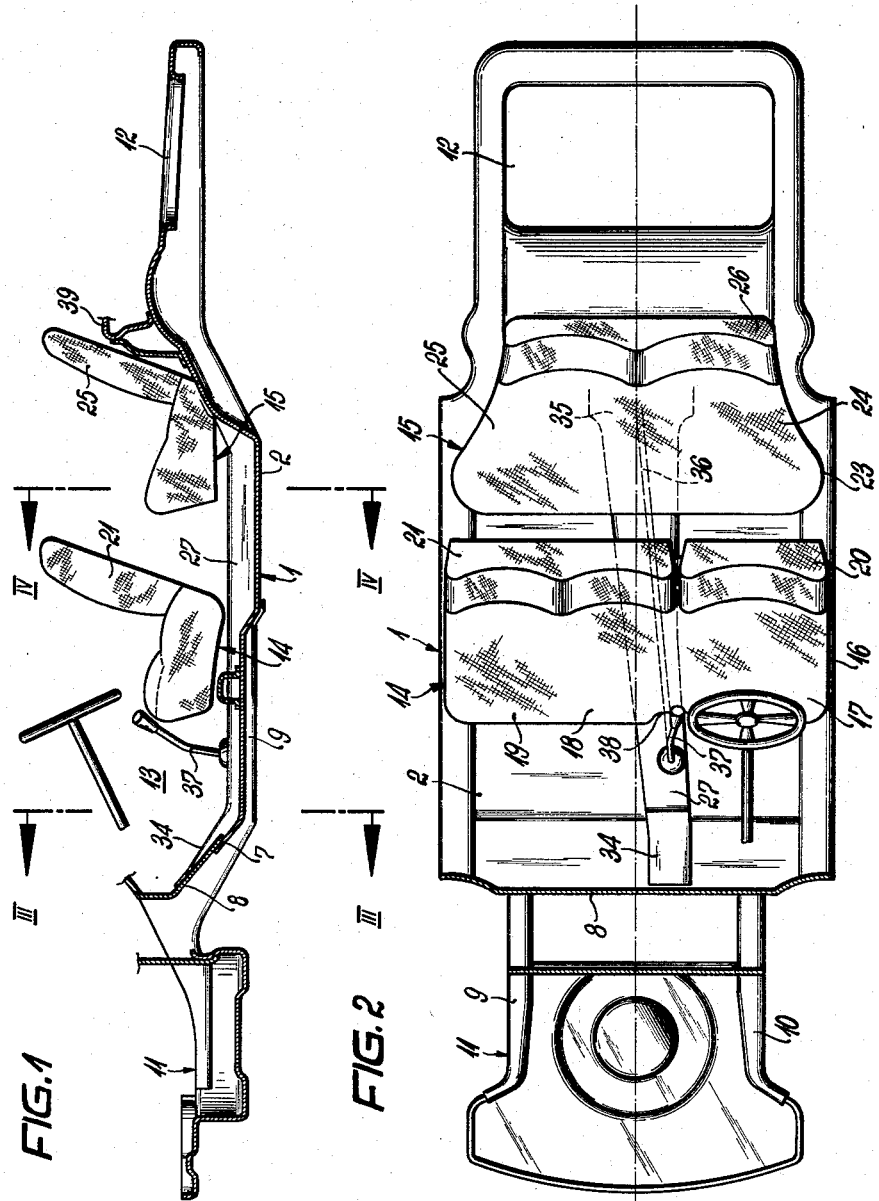

3,243,221
SEATING ARRANGEMENT FOR AUTOMOTIVE
VEHICLE BODY
Erwin Komenda, Stuttgart, Germany, assignor to Firma
Dr. Ing. h.c. F. Porsche KG., Stuttgart-Zuffenhausen,
Germany
Filed Apr. 7, 1964, Ser. No. 357,928
Claims priority, application Germany, Apr. 18, 1963,
P 31,620
3 Claims. (Cl. 296—28)

The present invention relates to a self-supporting vehicle body for passenger motor vehicles, the floor plate of which is provided with a tunnel extending in the longitudinal direction of the vehicle within the passenger space between the dashboard and a rear wall and with two rows of seats arranged one behind the other, of which the rear seat row has two seating places arranged symmetrically to the vehicle longitudinal center plane and the forward seat row includes a seating place disposed in the vehicle longitudinal center plane.

With the known constructions of the prior art having a tunnel extending in the vehicle longitudinal center plane, this seating distribution is taken into consideration in an inadequate manner in the design and construction of the foot space. In particular the passenger on the center seat of the forward seat row is strongly hindered and obstructed by the presence of the tunnel and therebeyond also the passengers seated alongside, whereby any obstruction or hindrance of the driver also entails a decrease in driving safety.

This is avoided in accordance with the present invention in that the tunnel of the floor plate is arranged off-set eccentrically to the vehicle longitudinal center plane within the area of the dashboard, extends in the direction toward the rear wall at an acute angle to the aforementioned plane and extends within the area of the rear wall symmetrically to the vehicle longitudinal center plane. It is possible by the design and construction according to the present invention of the floor plate to provide on the front seating bench three complete, fully satisfactory seating places, and more particularly in such a manner, that the driver is not hindered or obstructed by the passenger seated alongside. The ends of the tunnel disposed within the area of the dashboard and the rear wall have differently large cross sectional surfaces, whereby the cross sectional area of the end disposed in the region of the rear wall of the tunnel is larger than the cross sectional area of the tunnel end within the area of the dashboard. The part of the floor plate extending evenly, that is, in a flat, level manner, within the foot space of the front seats is thereby increased advantageously. The tunnel of the floor plate increases substantially continuously in the direction toward the rearwall whereby it is sub-divided into several sections with mutually different enlargement ratios. Furthermore, the tunnel of the floor plate has a height that is constant throughout, whereby a simplification in the manufacture, especially in the design and construction of the tools is achieved.

Accordingly, it is an object of the present invention to provide a self-supporting type vehicle body which eliminates the drawbacks and shortcomings encountered with the prior art constructions in a most effective manner.

Another object of the present invention resides in the provision of a self-supporting type vehicle body which permits an improved seating arrangement, especially for the front seats in motor vehicles.

Still a further object of the present invention resides in the provision of a motor vehicle provided with a self-supporting type body construction in which the front row of seats has three seats, yet the obstruction caused by the presence of the tunnel within the area of the floor space is kept to a minimum.

Another object of the present invention resides in the provision of a vehicle body of the type described hereinabove in which the tunnel provided in the floor plate is so constructed and arranged as to minimize the impairment to the foot space of the passengers while enabling the accommodation of three fully useful seats in the front seat of the vehicle.

Still another object of the present invention resides in the provision of a motor vehicle having a self-supporting type body construction in which the manufacture of the floor plate and tunnel is greatly simplified.

These and other objects, features and advantages of the present invention will become more obvious from the following description when taken in connection with the accompanying drawing which shows, for purposes of illustration only, one embodiment in accordance with the present invention, and wherein FIGURE 1 is a somewhat schematic longitudinal cross sectional view through the sub-frame of a self-supporting type vehicle body of a passenger motor vehicle whereby two rows of seats are arranged at the sub-frame.

FIGURE 2 is a somewhat schematic top plan view on the sub-frame of FIGURE 1.

FIGURE 3 is a cross sectional view taken along line III—III of FIGURE 1, and

FIGURE 4 is a cross sectional view taken along line IV—IV of FIGURE 1.

Referring now to the drawing wherein like reference numerals are used throughout the various views to designate like parts in the several figures thereof, reference numeral 1 generally designates therein the chassis frame or sub-frame of the self-supporting type vehicle body which comprises a floor plate 2 that forms along each of the lateral rims 3 thereof together with a respective vertical reinforcing web sheet metal member 4 and a step-shaped pressed-out part 5, a box-shaped longitudinal bearer member. Sill members 6 are secured at the sheet metal members 4 within the area of the boarding or door apertures of the body. A pressed-out part 8 adjoins the rim 7 of the floor plate 2 in the longitudinal direction which forms the dashboard of the vehicle body and extends in one piece up to the windshield aperture (not shown in the drawing). Box-shaped bearers 9 and 10 of an end unit generally designated by reference numeral 11 are secured at the dashboard as well as at the adjoining part of the floor plate 2.

The floor plate 2 extends in one piece up to the rear end of the sub-frame within the area of which is provided an aperture 12 for the accommodation of an internal combustion engine (not shown) which, for example, may be combined with a change-speed transmission and with a differential gear into a drive unit.

Two rows of seats generally designated by reference numerals 14 and 15 are secured within the passenger space 13 of the passenger motor vehicle at floor plate 2 in any conventional manner, not illustrated in detail herein. The front seat row 14 includes a continuous seat bench 16 extending over the entire passenger space width which offers space for three persons, namely a driver and two passengers. Separate backrests 20 and 21 are coordinated to the seating place 17 of the driver, on the one hand, and to the seating places 18 and 19 of the passengers on the other. The seating place 18 is thereby disposed in the longitudinal center plane 22 of the vehicle.

The rear seat row 15 includes seating places 24 and 25 provided on a seat bench 23 to which is coordinated a common backrest 26. The seating places 24 and 25 are arranged on both sides of the vehicle longitudinal center plane 22 of the vehicle and symmetrically with respect thereto.

The floor plate 2 is provided with a tunnel 27 extending in the longitudinal direction of the vehicle which is constituted by the floor plate 2 and a pressed-out part 28 (FIGURES 3 and 4). For that purpose, the floor plate 2 is provided with a channel-shaped indentation 29 open in the upward direction. Channels 30 and 31, pressed out in the opposite direction extend on both sides of the indentation 29. The pressed-out part 28 is also constructed in a channel-shaped manner and possesses flanges 32 and 33 which during assembly of the sub-frame rest against the channels 30 and 31 of the floor plate 2 and are connected therewith, for instance, by spot welding.

The tunnel 27 does not extend, as is the case in the prior art chassis-frames or sub-frames, parallelly or symmetrically to the vehicle longitudinal center plane 22 but extends obliquely at an acute angle with respect to such plane. The end 34 of the tunnel 27 disposed within the area of the forward seat row 14 which terminates at the sheet metal dashboard 8 is laterally offset with respect to the vehicle longitudinal center plane 22 to such an extent that it extends in prolongation of the plane extending between the seating place 17 of the driver and the seating place 18 of the passenger.

The tunnel 27 extends toward the vehicle rear end at an acute angle to the vehicle longitudinal center plane 22 and is disposed within this plane below the rear seat bench 23 in proximity to the rear wall 39. The tunnel becomes wider from the forward end 34 in the direction toward the rear end whereby the end 35 of the tunnel 27 is approximately twice as wide as the forward end 34 thereof. The height of the tunnel 27, however, is constant throughout over the open horizontal extent thereof at the floor plate 2.

The hindrance to the passengers is reduced to a minimum by this construction of the tunnel 27 whereby the seating place 18 disposed within the vehicle longitudinal center plane 22 is also fully satisfactory and up to standard especially insofar as the construction and lay-out of the foot space for this seat place is concerned.

The tunnel 27 may, as is known, serve for the accommodation of linkages and lines. The linkage 36 for the change-speed transmission is then connected with a shifting lever 37 which is arranged at the tunnel 27 in front of the front seat bench 16. The shifting lever 37 is thereby disposed within easy reach of the driver. The seat bench 16 is provided with an aperture or indentation 38 which creates space for the shifting lever 37 during adjustment of the seat bench 14 in the vehicle longitudinal direction by any conventional means.

While I have shown and described one embodiment in accordance with the present invention, it is understood that the same is not limited thereto but is susceptible of numerous changes and modifications as known to a person skilled in the art and I therefore do not wish to be limited to the details shown and described herein but intend to cover all such changes and modifications as are encompassed by the scope of the appended claims.

I claim:

1. In a self-supporting type vehicle body for passenger motor vehicles having a floor plate provided with a tunnel extending substantially in the longitudinal direction of the vehicle between a dashboard and a rear wall of the vehicle and with two rows of seats disposed one behind the other of which the rear seat row has two seating places arranged substantially symmetrically to the vehicle longitudinal center plane and the forward seat row comprises a driving seat and a further seating place disposed substantially in the vehicle longitudinal center plane, the improvement essentially consising of a tunnel provided in said floor plate, said tunnel comprising a forward end section terminating at said dashboard, said end section extending parallel with and offset from said vehicle longitudinal center plane, said tunnel comprising a further section joining said forward end section forwardly of said forward seat row and at an acute angle to said vehicle longitudinal center plane, said further section increasing in width from front to rear and comprising portions spaced respectively below said forward seat row and below said rear seat row.

2. The improvement according to claim 1, wherein said floor plate comprises an indented portion adjoined on both sides by raised portions, said indented portion forming the bottom portion of said tunnel, said tunnel further comprising a channel-shaped portion secured to said raised portions.

3. The improvement according to claim 2, wherein said portion of said tunnel spaced below said rear seat row terminates in a portion extending within the area of said rear wall substantially symmetrically to said vehicle longitudinal center plane.

References Cited by the Examiner

UNITED STATES PATENTS

| | | | |
|---|---|---|---|
| 2,226,790 | 12/1940 | Valletta | 296—28 |
| 2,238,616 | 4/1941 | Wolf | 180—54 |
| 2,527,487 | 10/1950 | Paton | 180—54 |
| 3,064,493 | 11/1962 | Popovich et al. | 180—70 X |
| 3,097,876 | 7/1963 | Wilson | 296—23 |

FOREIGN PATENTS

| | | |
|---|---|---|
| 944,638 | 11/1948 | France. |
| 371,333 | 3/1923 | Germany. |

BENJAMIN HERSH, *Primary Examiner.*

E. E. PORTER, *Assistant Examiner.*